Aug. 26, 1952    G. SCHNEIDER ET AL    2,607,954
METHOD AND APPARATUS FOR FORMING GEL-FREE
THERMOPLASTIC FILMS
Filed June 17, 1950
FIG.1.
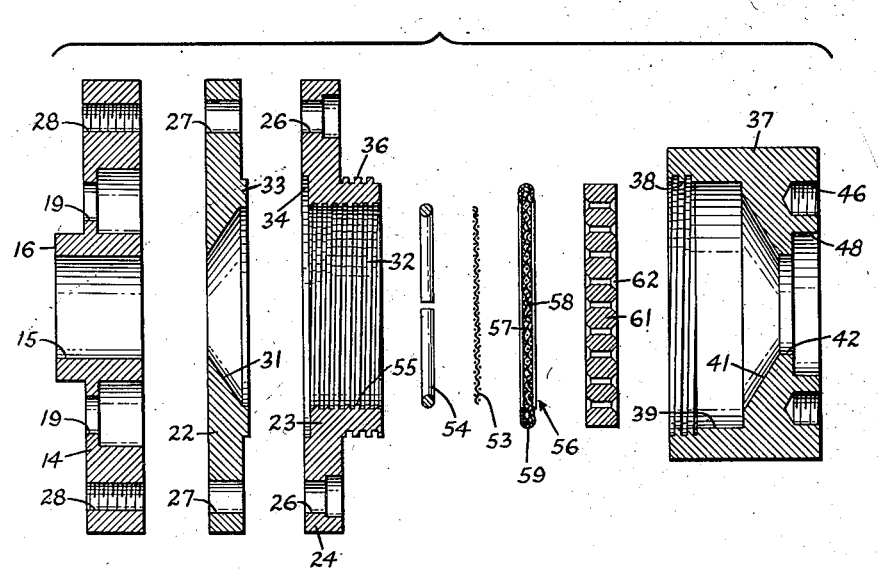
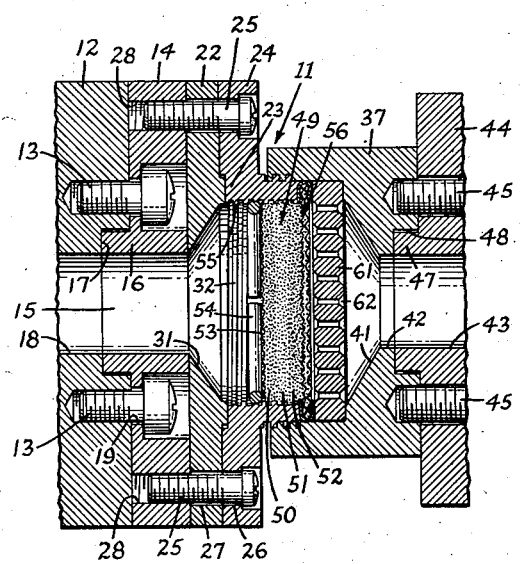
FIG.2.
INVENTORS.
GEORGE SCHNEIDER
BJORN ANDERSEN
BY
ATTORNEYS.

Patented Aug. 26, 1952

2,607,954

UNITED STATES PATENT OFFICE 2,607,954

METHOD AND APPARATUS FOR FORMING GEL-FREE THERMOPLASTIC FILMS

George Schneider, South Orange, and Bjorn Andersen, Maplewood, N. J., assignors to Celanese Corporation of America, New York, N. Y., a corporation of Delaware Application June 17, 1950, Serial No. 168,786

15 Claims. (Cl. 18—15)

This invention relates to the production of films and relates more particularly to an improved process and apparatus for the production of films by the extrusion of a composition comprising thermoplastic material and a plasticizer therefor.

An important object of this invention is to provide a process and apparatus for the production of films by the extrusion of a plasticized thermoplastic material which will produce films that exhibit a good optical homogeneity and are substantially free from gels.

A further object of this invention is the provision of a process and apparatus for the production of films by the extrusion of a plasticized thermoplastic material in which the said material is passed at an elevated temperature and before it is shaped to form a film through a filtering medium comprising a layer of inert granules.

Other objects of this invention, together with certain details of construction and combinations of parts, will be apparent from the following detailed description and claims.

Films have heretofore been produced by extruding through a suitable shaping nozzle a heated composition comprising a mixture of a thermoplastic material such as cellulose acetate or other organic derivative of cellulose and a plasticizer therefor, which composition contained no volatile solvent for the thermoplastic material. Although this process is highly efficient with respect to economy in the use of equipment, it is not wholly satisfactory in that the extruded films exhibit a poor optical homogeneity and are therefore suited for only a limited number of applications. The poor appearance of the extruded films is due, at least in part, to the presence in said films of gels whose optical properties, such as refractive index, differ from those of the major portion of the thermoplastic material and which appear as discrete blemishes or small particles of colloidal appearance in the extruded films.

It has now been discovered that it is possible to remove substantially all the gels, as well as foreign matter such as dirt or the like, from the thermoplastic material by passing the heated thermoplastic material through a filtering medium comprising a layer of granules that are chemically inert to the thermoplastic material and retain their shape at the temperatures employed. After being passed through the filtering medium, the thermoplastic material may be extruded through a suitable shaping nozzle and will form a film that exhibits a good clarity and optical homogeneity and is substantially free from gels.

The filtering medium that is employed in carrying out this invention may be formed from one or more layers of granules of sand, ceramic materials, glass, metal or the like. To obtain the most effective removal of the gels from the thermoplastic material, the granules employed in at least one of the layers should be between about 40 and 100 mesh. Coarser granules will not adequately remove all the gels, whereas still finer granules will slow up the filtration rate excessively. Preferably, the filtering medium comprises a first layer of granules of between about 20 and 50 mesh which serves to remove any large gels that are present in the thermoplastic material, a second layer of granules of between about 40 and 100 mesh which serves to remove substantially all the remaining gels from the thermoplastic material, and a third layer of granules of between 20 and 50 mesh which serves to keep the finer granules in the second layer from lodging in and clogging the apertures of the screen that is employed to support the filtering medium. By removing any large gels that are present in the thermoplastic material in a layer of relatively coarse granules, the rapid clogging of the layer of fine granules is prevented, thereby lengthening the life of the filtering medium. The depth of the layers of granules through which the thermoplastic material is passed may be varied over a considerable range. Care should be taken, however, to avoid the use of extremely deep layers for this purpose, since such layers will offer an excessive resistance to the flow of the heated thermoplastic material and will increase the dwell time of the thermoplastic material in said layers. This will cause excessive degradation of the thermoplastic material which will impair the properties of the extruded films. Generally, the combined depth of all the layers of granules should not exceed about 50 mm. and the dwell time of the thermoplastic material in said layers should not exceed about 200 seconds. To minimize any possibility of degrading the thermoplastic material during the extrusion operation the temperature should be kept at a minimum consistent with the free flow of said material to and through the shaping nozzle. In the case of cellulose acetate or other organic derivative of cellulose material, the temperature should be kept at between about 160 and 300° C.

The layers of granules which function as a filtering medium may be positioned in a filter through which the thermoplastic material is forced by means of an extruder on its way to the extrusion nozzle. The filter should be designed to give the maximum filter area with a minimum dwell of the thermoplastic material and should be streamlined to avoid all possible obstructions to the flow of the thermoplastic material therethrough. To obtain an effective removal of gels from the thermoplastic material without offering an excessive resistance to the flow of said material through the filter and without an excessive dwell time, the filter area should be between about 1 and 10 times as great as the cross-sectional area of the extruder.

In packing the several layers of granules into the filter, it is convenient to hold the filter vertically, i. e., with all of the layers in a horizontal plane. The filter is mounted in an extrusion apparatus in a horizontal position, the layers being arranged vertically. To keep the granules from shifting when the filter is in the horizontal position, the layers of granules are preferably wet with a plasticizing agent for the thermoplastic material while the filter is still in a vertical position. The wetting of the granules with a plasticizing agent also serves to facilitate the start of the extrusion operation by softening and plasticizing the first mass of thermoplastic material going through the filter and by assisting in the heat transfer during the warm-up period. The plasticizer employed for wetting the granules is preferably the same as that present in the thermoplastic material.

Further to improve the uniform appearance of the extruded films, the thermoplastic material is treated to reduce its moisture content to less than about 0.10% or preferably less than about 0.03% by weight before the extrusion operation. This treatment may be effected by heating the thermoplastic material to a temperature below its softening point until the desired reduction in its moisture content has been effected. The heating may be carried out in a well ventilated air oven. The heating may also be carried out at a pressure of below about 10 mm. of mercury absolute and at a temperature of about 65 to 95° C. when it is desired to effect the maximum reduction in the moisture content of the thermoplastic material, particularly when the thermoplastic material is treated in the form of relatively coarse particles such as are commonly employed for molding operations. For rapid drying, the materials are arranged in relatively shallow layers of less than about one-half inch thickness during the drying operation.

The process of this invention will now be described in connection with the production of films from cellulose acetate, which is commercially the most important organic derivative of cellulose at the present time. It is to be understood, however, that it may also be employed for the production of films from other organic derivative of cellulose materials, such as cellulose propionate, cellulose butyrate, cellulose acetate-propionate, cellulose acetate-butyrate, ethyl cellulose, and the like. The organic derivative of cellulose materials are employed in admixture with suitable plasticizers, such as diethyl phthalate, dimethyl phthalate, triacetin, triethyl citrate, triphenyl phosphate and the like. They may also contain fire retardants, ultra-violet light absorbents, dyes, anti-tackiness agents, pigments, nacreous substances and other effect materials.

A preferred embodiment of the apparatus of this invention is shown in the accompanying drawing wherein, Fig. 1 is an exploded cross-sectional view showing the parts of the filter, and Fig. 2 is a cross-sectional view showing the assembled filter mounted in an extrusion apparatus.

Referring now to the drawing, the reference numeral 11 designates generally a filter that is fastened to the face plate 12 of a conventional extruder (not shown) by means of bolts 13. The filter 11 comprises a plate 14 that is provided with a passageway 15 extending therethrough and has an annular boss 16 projecting from one face thereof. The boss 16 is positioned in a seat 17 in the face plate 12 and thereby the passageway 15 is aligned with a passageway 18 in the face plate 12, through which passageway 18 the thermoplastic material emerges from the extruder at an elevated temperature. The plate 14 is also provided with countersunk apertures 19 extending therethrough to receive the bolts 13.

A plate 22 and a tubular member 23, that has a flange 24 extending around the periphery thereof, are fastened to the plate 14 by means of threaded bolts 25 that extend through countersunk apertures 26 in the flange 24 and apertures 27 in the plate 22 into engagement with threaded apertures 28 in the plate 14. The plate 22 is provided with a passageway 31 of frusto-conical cross-section extending therethrough and leading from the passageway 15 in the plate 14 to a chamber 32 in the tubular member 23. To align the passageway 31 properly with respect to the chamber 32, the plate 22 has an annular boss 33 projecting from one face thereof, which boss 33 is adapted to be received in seat 34 in the tubular member 23.

The front end of the tubular member 23 is provided with external threads 36 and has mounted thereon, in engagement with said threads, a fitting 37 that is internally threaded at 38. Extending through a portion of the fitting 37 is a cylindrical bore 39 that leads from the chamber 32 to a passageway 41 of frusto-conical cross-section. The passageway 41 opens into a passageway 42 through which the thermoplastic material flows from the filter 11 into a passageway 43 in back plate 44 of a conventional extrusion nozzle (not shown). The back plate 44 is secured to the fitting 37 by means of threaded bolts 45 that engage threaded apertures 46 in the fitting 37 and is positioned properly to align the passageway 42 and 43 by means of an annular boss 47 that projects from said back plate 44 and is received in seat 48 in said fitting.

A filtering medium, indicated generally by reference numeral 49, is positioned in the chamber 32 and comprises a first layer 50 of 30–40 mesh sand, a second layer 51 of 60–80 mesh sand and a third layer 52 of 20–30 mesh sand. On the inlet side, the filtering medium is held in place by means of a fine screen 53 of approximately 80 mesh that is secured against the layer 50 by means of a split ring 54 in engagement with threads 55 on the interior of the tubular member 23. On the outlet side, the filtering medium is held in place by means of a screen assembly, indicated generally by reference numeral 56, comprising a fine screen 57 of approximately 120 mesh and a coarse screen 58 of approximately 10 mesh. The screen assembly 56 is edge sealed by means of a gasket 59 and is clamped between the front face of the tubular member 23 and a backing plate 61, which is positioned in the bore 39 of the fitting 37 and has a plurality of apertures 62 extending therethrough. As the thermoplastic material being extruded flows through the filter 11 from the extruder to the extrusion nozzle, it passes through the filtering medium 49, which acts to remove substantially all gels therefrom, assuring the production of an optically homogeneous film substantially free from blemishes.

The following examples are given to illustrate this invention further.

*Example I*

The filter shown in the accompanying drawing is packed with sand as described above while in a vertical position, the sand wet with diethyl phthalate and the filter mounted in a horizontal position in an extrusion apparatus. A cellulose acetate material in the form of relatively coarse particles and containing 27 parts by weight of diethyl phthalate for each 100 parts by weight of cellulose acetate is air dried with occasional stirring for 20 minutes at 120–130° C., in an infrared oven and is then extruded at a temperature of 270° C. through the extrusion apparatus to produce a film. The extruded film exhibits a good optical homogeneity and is substantially free from objectionable gels or surface blemishes.

A film produced from the same material without the use of a filter exhibits a poorer appearance and contains a substantial number of relatively large gels.

*Example II*

A cellulose acetate material in the form of relatively coarse particles and containing 27 parts by weight of diethyl phthalate for each 100 parts by weight of cellulose acetate is dried for 18 hours at a temperature of 80° C. and under a pressure of 1 mm. of mercury absolute. The vacuum dried material, which contains less than 0.03% by weight of water, is then extruded at a temperature of 270 C. to produce a film in the manner set forth in Example I. The extruded film exhibits a much better appearance than the films obtained by following the process of Example I and is substantially free from relatively large gels.

A film produced from the same material without the use of a filter exhibits poor optical properties and contains a substantial number of relatively large gels.

*Example III*

A cellulose acetate material in the form of relatively coarse particles and containing 27 parts by weight of diethyl phthalate for each 100 parts by weight of cellulose acetate is dried for 3 hours in a well vented circulating air oven at a temperature of 115° C. The dried material, which contains less than 0.03% by weight of water, is then extruded to produce a film in the manner set forth in Example I. The extruded film is comparable in appearance to the film obtained by following the process of Example II.

*Example IV*

A cellulose acetate material in the form of relatively coarse particles and containing 40 parts by weight of diethyl phthalate for each 100 parts of cellulose acetate is dried for 20 minutes at 120–130° C. in an infra-red oven and is then extruded at a temperature of 250° C. through the extrusion apparatus to produce a film. The extruded film is comparable in appearance to the film obtained by following the process of Example I.

*Example V*

The filter shown in the accompanying drawing is packed with ground ceramic particles while in a vertical position, employing a first layer of 30–40 mesh particles, a second layer of 40–50 mesh particles and a third layer of 30–40 mesh particles, the particles wet with diethyl phthalate and the filter mounted in a horizontal position in an extrusion apparatus. A cellulose acetate material in the form of relatively coarse particles and containing 27 parts by weight of cellulose acetate is dried for 3 hours in a well vented circulating air oven at a temperature of 115° C. The dried material, which contains less than 0.03% by weight of water, is then extruded at a temperature of 270 C. through the extrusion apparatus to produce a film. The extruded film exhibits a good optical homogeneity, is substantially free from objectionable gels or surface blemishes and is comparable in appearance to the film obtained by following the process of Example II.

*Example VI*

The filter shown in the accompanying drawing is packed with sand while in a vertical position, employing a first layer of 30–40 mesh sand, a second layer of 80–100 mesh and a third layer of 30–40 mesh sand, the sand wet with diethyl phthalate and the filter mounted in a horizontal position in an extrusion apparatus. A cellulose acetate material in the form of relatively coarse particles and containing 28 parts by weight of diethyl phthalate for each 100 parts by weight of cellulose acetate is dried for 3 hours in a well vented circulating air oven at a temperature of 115° C. The dried material, which contains less than 0.03% by weight of water, is then extruded at a temperature of 270° C. through the extrusion apparatus to produce a film. The extruded film exhibits a good optical homogeneity, is substantially free from objectionable gels or surface blemishes and is comparable in appearance to the film obtained by following the process of Example II.

It is to be understood that the foregoing detailed description is given merely by way of illustration and that many variations may be made therein without departing from the spirit of our invention.

Having described our invention, what we desire to secure by Letters Patent is:

1. In a process for the production of films by the extrusion through a shaping nozzle at an elevated temperature of a gel-containing thermoplastic material, the step of passing the thermoplastic material at an elevated temperature through a filtering medium comprising a layer of inert granules, wet with a plasticizer for said thermoplastic material before said thermoplastic material is passed through the shaping nozzle, whereby gels are removed and the optical homogeneity of the extruded films is improved.

2. In a process for the production of films by the extrusion through a shaping nozzle at an elevated temperature of a gel-containing thermoplastic organic derivative of cellulose material in admixture with a plasticizer, the step of passing the thermoplastic organic derivative of cellulose material at an elevated temperature through a filtering medium comprising a layer of inert granules, wet with a plasticizer for the organic derivative of cellulose, before said thermoplastic organic derivative of cellulose material is passed through the shaping nozzle, whereby gels are removed and the optical homogeneity of the extruded films is improved.

3. In a process for the production of films by the extrusion through a shaping nozzle at an elevated temperature of a gel-containing a thermoplastic organic derivative of cellulose material in admixture with a plasticizer, the step of passing the thermoplastic organic derivative of cellulose material at an elevated temperature through a filtering medium comprising a layer of inert granules of between about 40 and 100 mesh, wet with a plasticizer for the organic derivative of cellulose, before said thermoplastic organic derivative of cellulose material is passed through the shaping nozzle, whereby gels are removed and the optical homogeneity of the extruded films is improved.

4. In a process for the production of films by the extrusion through a shaping nozzle at an elevated temperature of a gel-containing a thermoplastic organic derivative of cellulose material in admixture with a plasticizer, the step of passing the thermoplastic organic derivative of cellulose material at an elevated temperature through a filtering medium comprising a layer of inert granules of between about 20 and 50 mesh, a second layer of inert granules of between about 40 and 100 mesh, and a third layer of inert granules of between about 20 and 50 mesh, said layers of inert granules being wet with a plasticizer for the organic derivative of cellulose, before said thermoplastic organic derivative of cellulose material is passed through the shaping nozzle, whereby gels are removed and the optical homogeneity of the extruded films is improved.

5. In a process for the production of films by the extrusion through a shaping nozzle at an elevated temperature of a gel-containing a thermoplastic organic derivative of cellulose material in admixture with a plasticizer, the steps of drying the thermoplastic organic derivative of cellulose material, wetting a filtering medium comprising a layer of inert granules with a plasticizer, and passing the dried thermoplastic organic derivative of cellulose material at an elevated temperature through the plasticizer-wet filtering medium before said thermoplastic organic derivative of cellulose material is passed through the shaping nozzle, whereby gels are removed and the optical homogeneity of the extruded films is improved.

6. In a process for the production of films by the extrusion through a shaping nozzle at an elevated temperature of a gel-containing a thermoplastic organic derivative of cellulose material in admixture with a plasticizer, the steps of drying the thermoplastic organic derivative of cellulose material to a moisture content of less than about 0.10% by weight, wetting a filtering medium comprising a layer of inert granules with a plasticizer, and passing the dried thermoplastic organic derivative of cellulose material at an elevated temperature through the plasticizer-wet filtering medium before said thermoplastic organic derivative of cellulose material is passed through the shaping nozzle, whereby gels are removed and the optical homogeneity of the extruded films is improved.

7. In a process for the production of films by the extrusion through a shaping nozzle at an elevated temperature of a gel-containing cellulose acetate material in admixture with a plasticizer, the step of passing the cellulose acetate material at an elevated temperature through a filtering medium comprising a layer of inert granules, wet with a plasticizer for the cellulose acetate, before said cellulose acetate material is passed through the shaping nozzle, whereby gels are removed and the optical homogeneity of the extruded films is improved.

8. In a process for the production of films by the extrusion through a shaping nozzle at an elevated temperature of a gel-containing cellulose acetate material in admixture with a plasticizer, the step of passing the cellulose acetate material at an elevated temperature through a filtering medium comprising a layer of inert granules of between about 20 and 50 mesh, a second layer of inert granules of between about 40 and 100 mesh, and a third layer of inert granules of between about 20 and 50 mesh, said layers of inert granules being wet with a plasticizer for the cellulose actate, before said cellulose acetate material is passed through the shaping nozzle, whereby gels are removed and the optical homogeneity of the extruded films is improved.

9. In a process for the production of films by the extrusion through a shaping nozzle at an elevated temperature of a gel-containing cellulose acetate material in admixture with a plasticizer, the steps of drying the cellulose acetate material at a pressure of less than about 10 mm. of mercury absolute to a moisture content of less than about 0.03% by weight, wetting a filtering medium comprising a layer of sand granules of between about 20 and 50 mesh, a second layer of sand granules of between about 40 and 100 mesh, and a third layer of sand granules of between about 20 and 50 mesh with a plasticizer, and passing the dried cellulose acetate material at a temperature of between about 160 and 300° C. through the plasticizer-wet filtering medium before it is passed through the shaping nozzle, whereby gels are removed and the optical homogeneity of the exruded films is improved.

10. In an apparatus for the production of films wherein a gel-containing thermoplastic material is forced through a shaping nozzle at an elevated temperature by means of an extruder, a filtering medium comprising a layer of inert granules, wet with a plasticizer for the thermoplastic material, positioned between the extruder and the shaping nozzle, whereby gels are removed and the optical homogeneity of the extruded films is improved.

11. In an apparatus for the production of films wherein a gel-containing thermoplastic material is forced through a shaping nozzle at an elevated temperature by means of an extruder a filtering medium comprising a layer of inert granules of between about 40 and 100 mesh, wet with a plasticizer for the thermoplastic material, positioned between the extruder and the shaping nozzle, whereby gels are removed and the optical homogeneity of the extruded films is improved.

12. In an apparatus for the production of films wherein a gel-containing thermoplastic material is forced through a shaping nozzle at an elevated temperature by means of an extruder, a filtering medium comprising a layer of inert granules of between about 20 and 50 mesh, a second layer of inert granules of between about 40 and 100 mesh, and a third layer of inert granules of between about 20 and 50 mesh, said layers of inert granules being wet with a plasticizer for the thermoplastic material, positioned between the extruder and the shaping nozzle, whereby gels are removed and the optical homogeneity of the extruded films is improved.

13. In an apparatus for the production of films wherein a gel-containing thermoplastic material is forced through a shaping nozzle at an elevated temperature by means of an extruder, a filtering medium comprising a layer of inert granules of between about 20 and 50 mesh, a second layer of inert granules of between about 40 and 100 mesh, and a third layer of inert granules of between about 20 and 50 mesh, said layers of inert granules being wet with a plasticizer for the thermoplastic material, positioned between the extruder and the shaping nozzle, whereby gels are removed and the optical homogeneity of the extruded films is improved, said filtering medium having an overall depth of less than about 50 mm.

14. In an apparatus for the production of films wherein a gel-containing thermoplastic material is forced through a shaping nozzle at an elevated temperature by means of an extruder, a filter comprising a tubular member having a chamber therein, and a layer of inert granules, wet with a plasticizer for the thermoplastic material, positioned in said chamber between the extruder and the shaping nozzle, whereby gels are removed and the optical homogeneity of the extruded films is improved.

15. In an apparatus for the production of films wherein a gel-containing thermoplastic material is forced through a shaping nozzle at an elevated temperature by means of an extruder, a filter comprising a tubular member having a chamber therein, a plate positioned to one side of said tubular member and having a passageway of frusto-conical cross-section extending therethrough and opening into said chamber, a fitting positioned to the other side of said tubular member and having a passageway of frusto-conical section extending therethrough and leading away from said chamber, a layer of sand granules of between about 20 and 50 mesh, a second layer of sand granules of between about 40 and 100 mesh, and a third layer of sand granules of between about 20 and 50 mesh, said layers of inert granules being wet with a plasticizer for the thermoplastic material, positioned in said chamber between the extruder and the shaping nozzle, whereby gels are removed and the optical homogeneity of the extruded films is improved, and screens positioned on both sides of said layers to support said layers.

GEORGE SCHNEIDER.
BJORN ANDERSEN.

REFERENCES CITED

The following references are of record in the file of this patent:

UNITED STATES PATENTS

| Number | Name | Date |
| --- | --- | --- |
| 651,173 | Weaver | June 5, 1900 |
| 773,946 | Langill | Nov. 1, 1904 |
| 2,138,184 | Martin | Nov. 29, 1938 |
| 2,262,989 | Conklin et al | Nov. 18, 1941 |
| 2,266,363 | Graves | Dec. 16, 1941 |
| 2,266,368 | Hull et al. | Dec. 16, 1941 |

OTHER REFERENCES

"Cellulose Ester Plastic Sheeting," Modern Plastics, May 1946, pages 132 to 136, 18-55.